United States Patent [19]

Blewett

[11] Patent Number: 5,034,183

[45] Date of Patent: Jul. 23, 1991

[54] APPARATUS FOR COLLIDING NUCLEAR PARTICLE BEAMS USING RING MAGNETS

[75] Inventor: John P. Blewett, New York, N.Y.

[73] Assignee: A E Labs, Inc., Princeton Junction, N.J.

[21] Appl. No.: 355,930

[22] Filed: May 23, 1989

[51] Int. Cl.$^5$ .............................................. G21B 1/02
[52] U.S. Cl. ................................... 376/107; 376/913; 376/142; 328/233
[58] Field of Search ............... 376/107, 100, 913, 915, 376/142; 328/233

[56] References Cited

U.S. PATENT DOCUMENTS

| | | | |
|---|---|---|---|
| 3,120,475 | 2/1964 | Bennett | 376/107 |
| 3,343,020 | 9/1967 | Gordon | 376/107 |
| 4,189,346 | 2/1980 | Jarnagin | 376/107 |
| 4,202,725 | 5/1980 | Jarnagin | 376/107 |
| 4,639,348 | 1/1987 | Jarnagin | 376/107 |
| 4,729,865 | 3/1988 | Busch | 376/107 |
| 4,788,024 | 11/1988 | Maglich et al. | 376/107 |
| 4,867,939 | 9/1989 | Deutch | 376/913 |

FOREIGN PATENT DOCUMENTS

| | | | |
|---|---|---|---|
| 3310844 | 9/1984 | Fed. Rep. of Germany | 376/107 |
| 884705 | 12/1961 | United Kingdom | 376/107 |

OTHER PUBLICATIONS

Muon Catalyzed Fusion-Fission Reactor Driven by a Recirculating Beam, Institute for Fusion Studies, The University of Texas, Austin, Texas, Jan. 1986, pp. 16, 19–31, FIG. 3, by Eliezer et al.

Contributions to the Muon-Catalyzed Fusion Workshop, (Jun. 1984), Jackson Hole, Wyoming, pp. 156–161, paper by Ottewitte.

EGG-SE-6290, May 1983, "Status and Prospects of Muon-Catalyzed Fusion Research", by Jones, pp. 1,29,47–53.

*Plasma Physics and Nuclear Fusion Research*, (1981) Academic Press, edited by Gills, pp. 415–431.

Nuclear Instruments and Methods, vol. 151, (1978) pp. 1–27, Maglich.

Nuclear Instruments and Methods, vol. 120, (1974) pp. 309–319, Maglich et al. (II).

IEEE Trans. on Nuclear Science, vol. NS-22, No. 3, Jun. 1975, pp. 1790–1793, Maglich et al. (III).

*High-Energy Physics and Nuclear Structure*, (1970), Plenum Press, New York, edited by Devons, pp. 613–614.

*Primary Examiner*—Harvey E. Behrend
*Attorney, Agent, or Firm*—Mathews, Woodbridge & Collins

[57] ABSTRACT

An apparatus for increasing the collisions of nuclear particles in a "migma" type device. This device employs ring magnets to reflect ions of energies coming from the ring axis back to the ring axis on orbits that precess around the axis. In this manner collisions can be made to occur at rates which are high enough to yield useful quantities of energy or other desired products.

2 Claims, 3 Drawing Sheets

APPARATUS FOR COLLIDING NUCLEAR PARTICLE BEAMS USING RING MAGNETS

BACKGROUND OF THE INVENTION

1. Field of the Invention

The invention relates to a method and apparatus for increasing the number of collisions between particles in a self-colliding beam.

2. Description of the Prior Art

Self-colliding particle beams hold promise for many applications which depend on nuclear reactions. Colliding beams are presently used in high-energy physics research but the rates of collision which have been achieved are too low by several orders of magnitude for applications such as the efficient production of:

energy;
neutrons;
tritium; and
anti-matter

Many attempts have been made in the national nuclear fusion energy program to produce nuclear reactions by heating electrical plasma discharges but, thus far, such attempts have not resulted in satisfactory reaction rates.

In U.S. Pat. No. 4,788,024 to Maglich and Menasian there is shown an apparatus and method for obtaining a self-colliding beam of charged particles operating above the space charge limit. The present invention is intended to operate independently or supplementary to the device of the Maglich and Menasian invention and the disclosure of that reference is hereby incorporated by reference.

Self-colliding particle beams are described in this application, as well as in the aforementioned patent of Maglich and Menasian. Such self-colliding particle beams give promise of combining the favorable features of colliding beams and hot plasma. If such features can be successfully combined, it may be possible to achieve nuclear reaction rates high enough to enable construction of practical nuclear reaction devices employing these concepts. Such devices may well provide viable energy sources, particularly energy sources free of neutrons and radioactive byproducts. Such devices may also be employed as breeders of nuclear fuel, intense neutron generators, or in the production of radioisotopes. Many other applications will be apparent to those familiar with the applications of nuclear reactions.

SUMMARY OF THE INVENTION

According to the present invention, there is provided an apparatus for the self-colliding of a charged particle beam, said apparatus comprising a beam of charged particles contained within a focusing field around an axis of symmetry within an evacuated region, the combination with said apparatus of a magnetic field of suitable geometry also within said evacuated region and surrounding said axis of symmetry and wherein said magnetic field serves to redirect charged particles back to the axis thereby increasing the collisions of the charges particles.

According to another embodiment of the present invention, there is provided a method of increasing the collisions of charged particles in an apparatus for the self-colliding of a charged particle beam, said apparatus comprising a beam of charged particles contained within a focusing field around an axis of symmetry within an evacuated field, i) providing a magnetic field of suitable geometry also within said evacuated region and surrounding said axis of symmetry and ii) redirecting charged particles back to the axis of symmetry by means of said magnetic field, thereby increasing the collisions of the charged particles.

DETAILED DESCRIPTION OF THE INVENTION

In its simplest form, the invention of the present invention includes a ring-shaped magnetic field within the evacuated field of an apparatus for obtaining a self-colliding beam of charged particles. Such an apparatus is shown in the above-cited U.S. Pat. No. 4,788,024 to Maglich and Manasian, the disclosure of which, as noted previously, is hereby incorporated by reference as if fully recited herein.

The invention of Maglich and Manasian, however, uses a magnetic field falling off weakly with radius. In such a field, ion orbits will cross each other at the axis of symmetry and precess around that axis.

The present invention is intended to improve on the containment methodology of Maglich and Manasian by the introduction of a versatile reflecting field which makes possible the achievement of materially higher ion densities, and which can also be employed to selectively expel ions whose energies are too high or too low.

Figure 1:
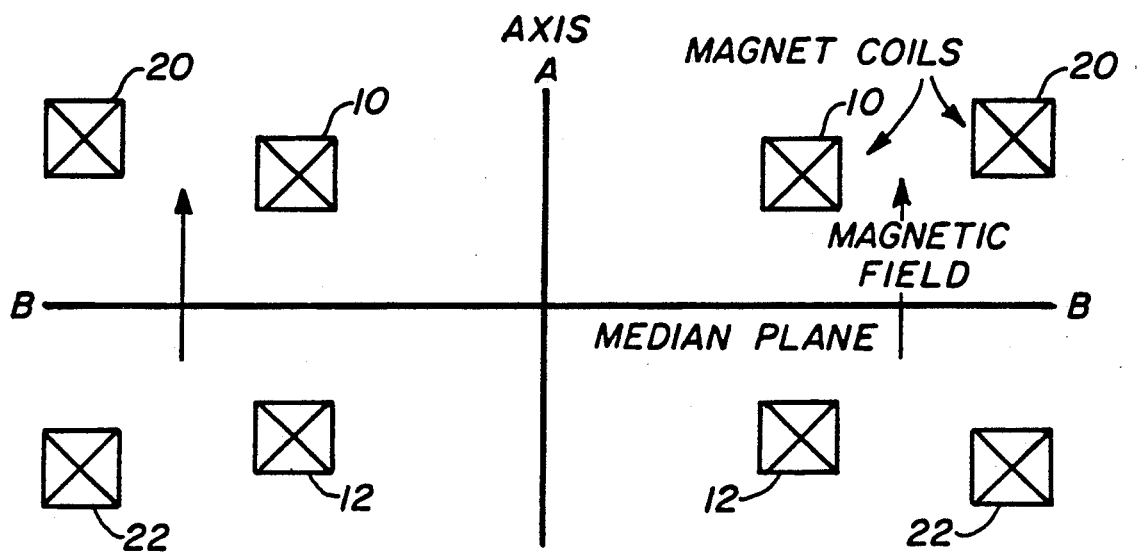
FIG. 1 shows the location of the magnetic coils necessary to provide a ring shaped magnetic field in the simplest embodiment of the present invention.

In FIG. 1, a ring-shaped magnetic field is provided around the axis of symmetry shown as A—A. this field is created some means, such as the wire-wound coils (10, 12, 20 and 22), possibly with iron yokes, which surround the axis, above and below the median plane B—B. The magnetic field produced by these coils is shown diagrammatically in FIG. 2.

Figure 2:
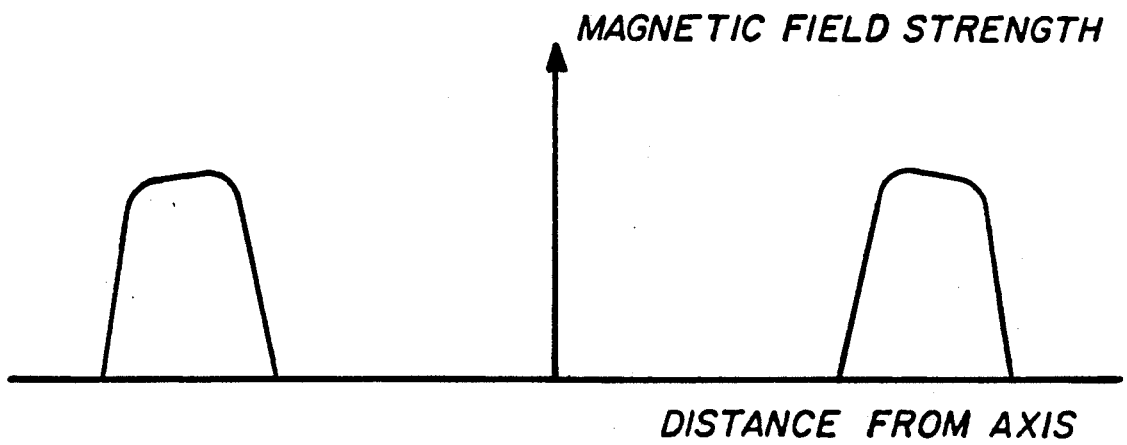
FIG. 2 shows, diagrammatically, the magnetic field strength produced by the coils of FIG. 1.

FIG. 2 shows a possible shape for the paraxial magnetic field in the median plane. The field strength inside the ring (between the magnet structure and the axis) may be zero or may be positive or negative and may vary with radius in a fashion dictated by the particular application the user has in mind. In particular, the magnetic field of the present invention may surround the field employed in U.S. Pat. No. 4,788,024.

Fields elsewhere in the space are determined from the median plane field pattern and the coil structure by the laws governing electromagnetic fields.

Figure 3:
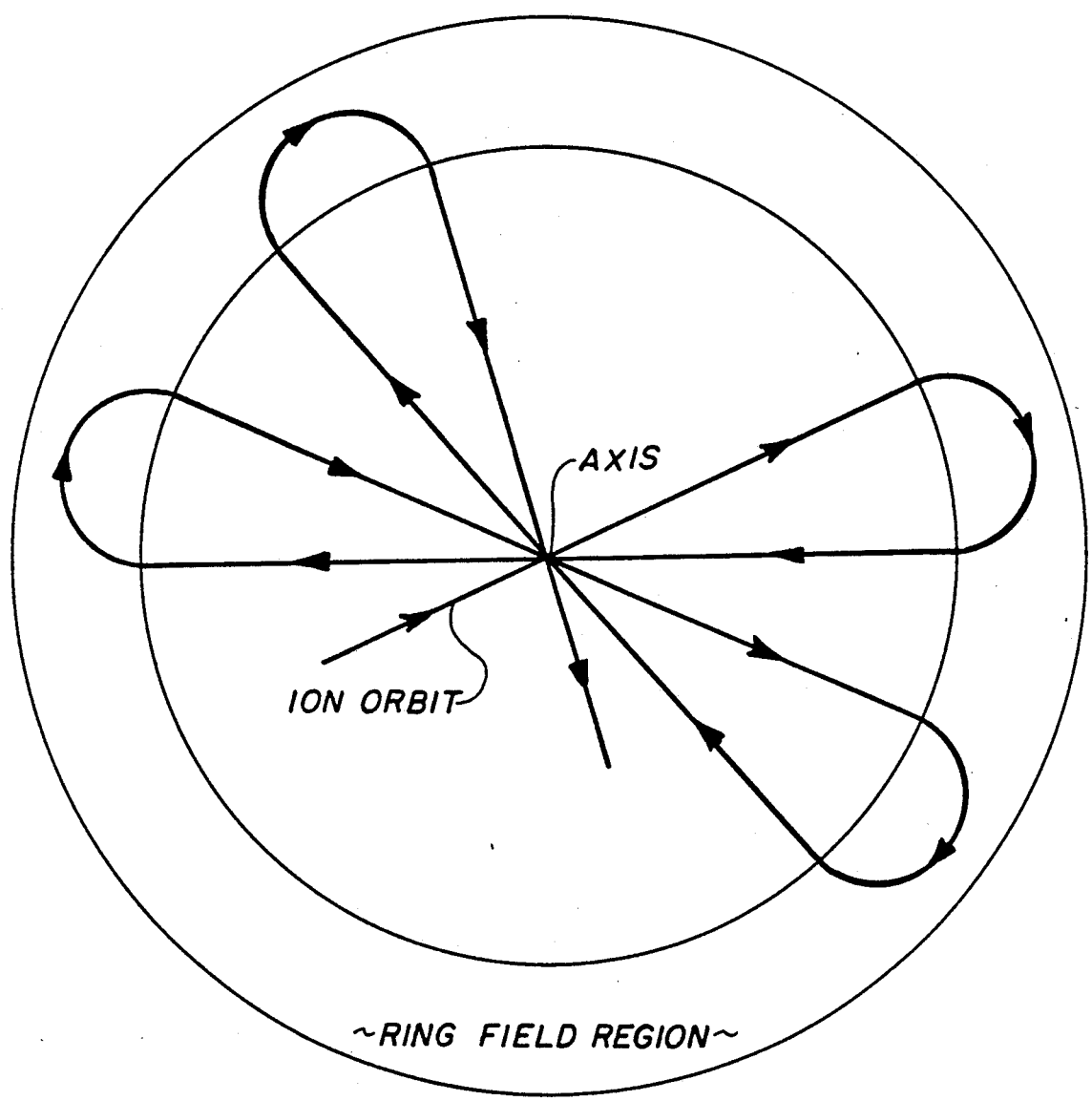
FIG. 3 shows the orbit of an ion as seen from above, as continually reflected by the ring shaped magnetic field of FIG. 2.

Charged particles (ions) are injected into the evacuated region, by various possible and well-known procedures, in such a fashion that their orbit passes through the axis. The particle energy and the field strength are chosen such that the ring field serves as a mirror and reflects the ion back to the axis. The ion orbit, seen from above, will then be as shown in FIG. 3.

Evidently the orbit precesses around the axis and, when many ions have been injected, there will be an intense concentration near the axis both of ions and of ion collisions.

It is necessary to review the motion of the ions normal to the median plane to determine whether the ions will be restrained to travel in stable orbits or whether they can be lost in the axial direction.

Employing the magnetic field of the present invention, an ion coming from the axis on an orbit not in the median plan, hereinafter referred to as an errant ion, will first encounter a rising field. This field will have a radial component that interacts with the azimuthal component of ion velocity in such a sense as to deflect the ion away from the median plane.

When such an errant ion enters the falling field pattern it will encounter a field force component directed back toward the median plane. This force will be strong for two reasons. First, the rising field has pushed the ion away from the median plane to regions where the restoring force (roughly proportional to distance from the median plane) is stronger. Second, because of the curvature of the orbit, the azimuthal component of velocity is becoming predominant; the restoring force is proportional to this component. Thus we have a version of the "strong-focusing" or "alternating-gradient focusing" used in all modern particle accelerators, where, as in optical systems, a combination of focusing and defocusing lenses can be strongly focusing.

Figure 4:
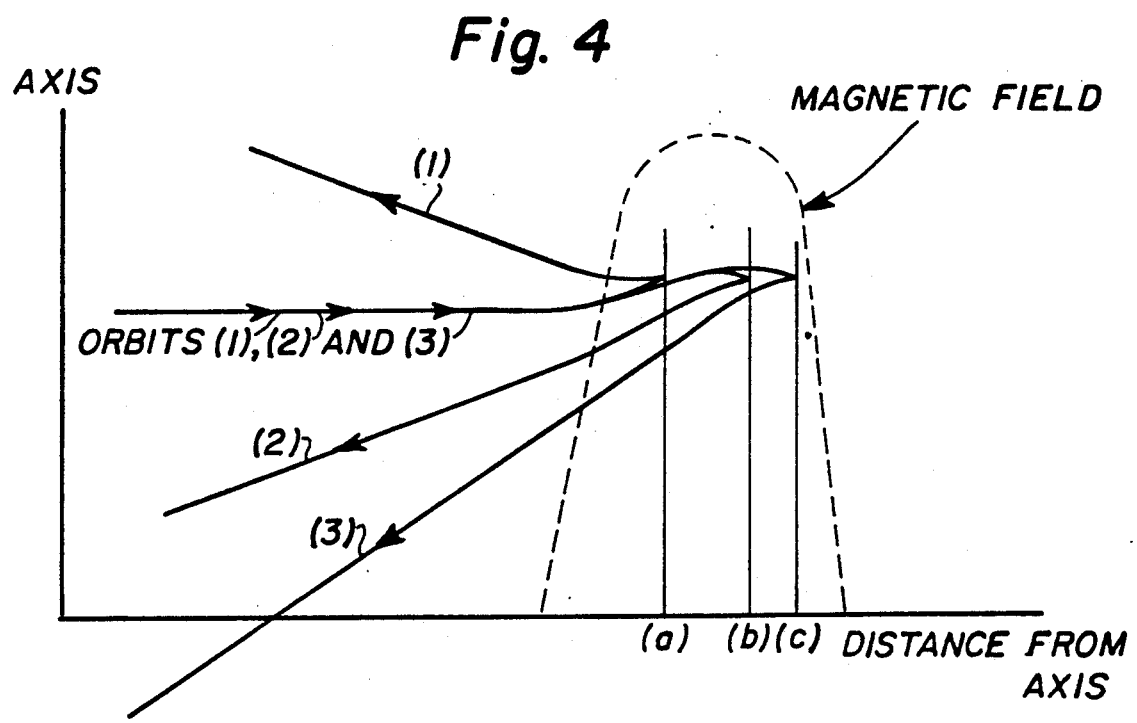
FIG. 4 illustrates the effect of the magnetic field on the three theoretical orbits of particles entering the ring-shaped magnetic field.

Three types of orbits are possible and are illustrated in FIG. 4. All three are shown entering the ring field on orbits parallel to the median plane but displaced from it. Orbit 1 is for an ion whose energy is too low; it penetrates the magnetic field only to point (a), whichis not far enough into the restoring field to have its direction restored toward the median plane. It will leave the ring field with its paraxial velocity component directed away from the median plane and will be lost. Orbit 2 is for an ion whose energy lies in an acceptable range. It penetrates the magnetic field to point (b). Its direction has been restored toward the median plane and it will enter the ring field on the opposite side with a displacement less than its initial displacement. It will continue to be reflected back and forth by the ring magnet on orbits which, from above, will look like the orbits shown in FIG. 3.

Orbit 3 is for an ion whose energy is so high that it penetrates too deeply into the falling-field, focusing region at point (c). In this case, "overfocusing" will occur; the ion direction is restored so strongly that it crosses the median plane before reaching the axis and so reaches the ring field again displaced further from the median plane than it was initially. Its paraxial displacement will continue to increase and eventually it will be lost in the axial direction.

Thus it is evident that the ring field is selective. Ions of too low energies will not penetrate far enough into the restoring field. Ions of too high energies will penetrate too far. In both cases the ions will be lost in the axial direction.

Figure 5:
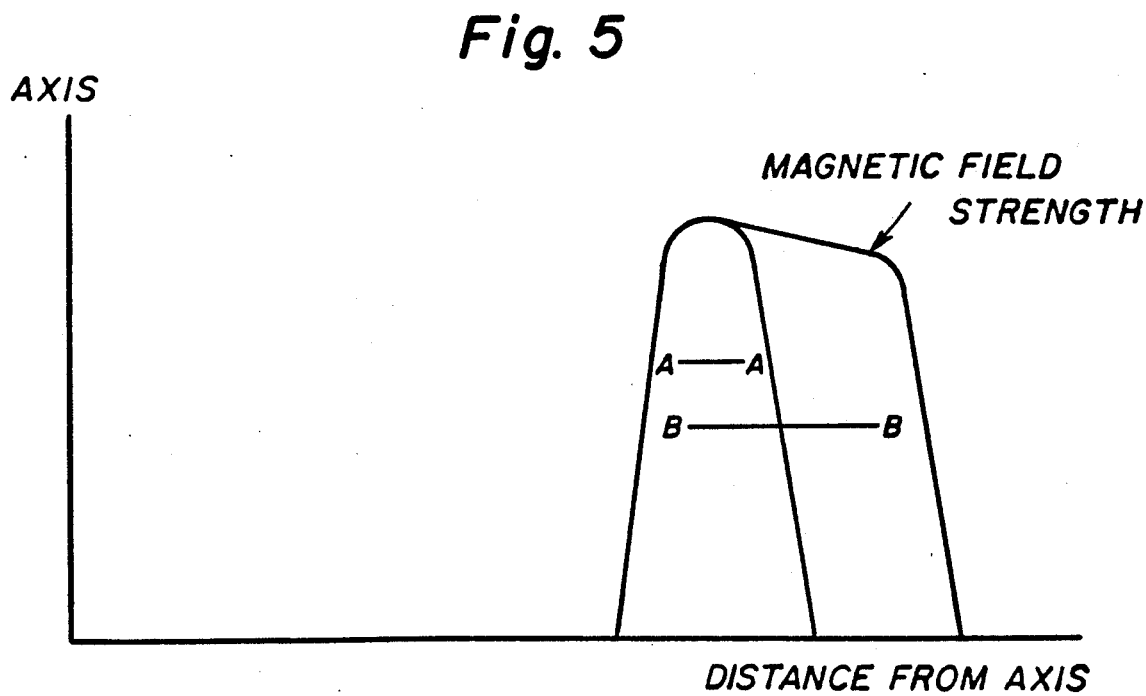
FIG. 5 shows how the magnetic field may be varied to vary the energy range of the particles reflected back by the magnetic field.

The proportional energy range to be accepted will be determined by the geometry of the field, and many field geometries are possible and may be preferred for different applications. A field pattern like that indicated by A—A in FIG. 5 will accept a relatively narrow energy range (10 to 20% of the mean energy). By decreasing the slope on the falling side of the field pattern as shown by the shape B—B in FIG. 5 the energy range accepted can be increased to an desired fraction of the mean energy.

If the magnetic field inside the ring is small or zero, it may be desirable to provide a supply of electrons to neutralize the ion space charge forces and so to be able to increase the ion density to much higher levels. This is done in the device of U.S. Pat. No. 4,788,0234, but there the electron motion is restricted by the strong magnetic field present everywhere and neutralization may be incomplete. In the present invention, if the central magnetic field is zero or weak, the electrons are free to migrate to wherever they are needed for neutralization.

Statements made above about magnetic fields and ion orbits follow from calculations using electromagnetic theory and the dynamics of charged particles. The correctness of the conclusions presented above will be evident to those skilled in the disciplines mentioned.

The conclusions presented hereby apply to ions of any type over a wide range of energies ranging from hundreds to billions of electron volts. Magnetic fields required are readily attainable using conventional (possibly superconducting) magnet structures.

Variations of the invention will readily occur to those skilled in the art—for example the system may include more than one ring magnet system or systems of various other geometries. Such changes do not depart from the spirit and scope of the invention.

Possible applications of the ring magnet system are listed below.

1) Energy production. Numerous reactions between light nuclei yield important quantities of energy (see, for example, the Proceedings of an International Symposium on Aneutronic Energy, *Nuclear Instruments and Methods in Physical Research*, Vol. A271, No. 1) The colliding beam system presented in this invention can be used to produce these reactions at rates sufficient to produce significant quantities of energy—possibly to pass the "breakeven" point and be able to contribute to the national energy resources.

2) Neutron source. Collisions between deuterons (and many other nuclei) yield neutrons. The present invention can be an important source of intense neutron yields. Intense neutron sources are needed for many applications including deactivation of radioactive waste.

3) Tritium production. Tritium, the hydrogen isotope of mass 3, is produced in collisions between deuterons (and in other nuclear reactions). Tritium is needed in some quantities for defense applications—it can be produced in useful quantities in the present invention.

The above applications call for ions in the energy range about 1 MeV. (1 million electron volts.) At energies higher by several thousand (in the GeV range) other important applications may become possible. Three examples follow:

4. Production of antimatter. Antiprotons are produced in many types of nuclear collisions at multi-GeV energies. These are the nuclei of antihydrogen. Antimatter could have many important uses and is of considerable present interest; it may be produced in significant amounts in the present invention.

5. High energy physics. The basic structure of the nucleon is under study in several colliding-beam accelerator laboratories. In deed, this is the objective for the costly "Superconducting Super Collider (SSC)" project now under development. With the present invention, build for multi-GeV energies, colliding beam studies would be possible with much higher intensity than possible using conventional accelerators. The present invention could be an intense meson source. It could at last be used to study collisions between mesons, which was the original (1970) objective of Maglich's colliding beam invention.

6. Synchrotron radiation. Energetic electrons in the ring magnet system will travel on paths similar to those travelled by ions. At energies in the 1 GeV range they will radiate intense synchrotron light from the curved part of their paths. Thus a ring magnet system supporting electron beams could be an intense source of synchrotron radiation, not in discrete beams as in present synchrotron radiation sources, but in all directions. A suitably located radio frequency accelerating system would be needed to supply the energy radiated by the electrons.

What is claimed is:

1. An apparatus for producing a self-colliding charged particle beam comprising:

magnetic focusing means for producing a ring-shaped magnetic field symmetrically spaced about an axis such that the magnetic field in a median plane perpendicular to said axis in the region across said ring-shaped field is unidirectional in a first direction parallel to said axis, and wherein said field is nonuniform with axial components in said first direction and radial components directed toward and away from said axis in the region above the below said plane such that the magnetic field strength of said field increases from substantially zero to some maximum value and then decreases to substantially zero as the radial distance between said field and said axis increases, said magnetic focusing means including fist, second, third and fourth concentric coils mounted coaxially with said axis, said first and second coils of substantially equal size spaced equally on either side of said median plane and magnetically polarized in said first direction, said third and fourth coils of substantially equal size to each other and of a smaller diameter than the diameters of said first and second coils, said third and fourth coils equally spaced on either side of said median plane and being magnetically polarized in the opposite direction to the polarization direction of said first and second coils; and particle beam means including a plurality of high-velocity, charged particles having orbits that intersect said plane, said axis and said ring-shaped magnetic field, sand wherein said charged particles travel radially away from said axis in in substantially straight lines, interact with said axial components to curve as they traverse said field, and then travel radially toward said axis in substantially straight lines, and wherein particles traversing said field above and below said plane and having velocities in a predetermined range are focused axially into said median plane by said radial components and particles having velocities outside said range are defocused axially away from said median plane by said radial components.

2. A method of producing a self-colliding charged particle beam comprising:

forming a ring-shaped magnetic field symmetrically spaced about an axis with first, second, third and fourth concentric coils mounted coaxially with said axis, said first and second coils of substantially equal size magnetically polarized in a first axial direction and spaced equally on either side of a median plane perpendicular to said axis, said third and fourth coils of substantially equal size and of a smaller diameter than the diameters of said first and second coils, said third and four coils equally spaced on either side of said median plane and being magnetically polarized in the opposite direction to the polarization direction of said first and second coils such that the magnetic field in said median plane is substantially zero in the region of said axis and in the region across said ring-shaped field is unidirectional in said first axial direction, and wherein said field is nonuniform with axial components in said first axial direction and radial components in the region above and below said plane such that the magnetic field strength of said field increases from substantially zero to some maximum value and then decreases to substantially zero as the radial distance between said field and said axis increases;

directing a plurality of high-velocity, charged particles in substantially straight, radial lines from said axis toward said ring-shaped field;

causing said particles to interact with said axial components and curve as they traverse said field;

causing said particles to interact with said radial components such that particles traversing said ring-shaped field above and below said median plane and having velocities in a predetermined range are focused axially toward said median plane by said radial components and particles having velocities outside said range are defocused axially away from said median plane by said radial components; and causing said particles to leave said field and travel radially toward said axis in substantially straight lines.

* * * * *

UNITED STATES PATENT AND TRADEMARK OFFICE
CERTIFICATE OF CORRECTION

PATENT NO. : 5,034,183
DATED : July 23, 1991
INVENTOR(S) : John P. Blewett

It is certified that error appears in the above-identified patent and that said Letters Patent is hereby corrected as shown below:

Column 2, line 47, "this" should be --This--.

Column 4, line 3, "an" should be --any--.

Column 4, line 66, "In deed" should be --Indeed--.

Column 5, line 1, "build" should be --built--.

Column 5, Claim 1, line 30, the second "the" should be --and--.

Claim 1, line 36, "fist" should be --first--.

Claim 1, line 52, "sand" should be --and--.

Claim 1, line 54, remove one "in".

UNITED STATES PATENT AND TRADEMARK OFFICE
CERTIFICATE OF CORRECTION

PATENT NO. : 5,034,183

DATED : July 23, 1991

INVENTOR(S) : John P. Blewett

It is certified that error appears in the above-identified patent and that said Letters Patent is hereby corrected as shown below:

Column 6, Claim 2, line 21, "four" should be --fourth--.

Signed and Sealed this

Twenty-third Day of February, 1993

*Attest:*

STEPHEN G. KUNIN

*Attesting Officer*      *Acting Commissioner of Patents and Trademarks*